United States Patent [19]
Jonsson

[11] 3,968,821
[45] July 13, 1976

[54] TREE FELLING DEVICE

[76] Inventor: Karl-Erik Arnold Jonsson, Floraplan 14, Gavle, Sweden

[22] Filed: May 21, 1975

[21] Appl. No.: 579,727

[30] Foreign Application Priority Data
July 24, 1974  Sweden............................. 7409613

[52] U.S. Cl.............................. 144/34 R; 83/490; 83/853; 83/928; 144/3 D; 144/309 AC
[51] Int. Cl.².......................................... A01G 23/08
[58] Field of Search ............. 83/788, 795, 928, 835, 83/523, 853, 854, 490, 491; 30/383, 384, 385, 386; 144/2 N, 2 Z, 3 D, 34 R, 309 AC, 312

[56] References Cited
UNITED STATES PATENTS
3,854,510   12/1974   Matlik............................... 144/34 R
3,857,425   12/1974   Wiklund............................ 144/34 R Primary Examiner—Othell M. Simpson
Assistant Examiner—W. D. Bray
Attorney, Agent, or Firm—Wenderoth, Lind & Ponack

[57] ABSTRACT

A tree felling device comprising a spherical bowl carrying an endless saw chain along its peripheral edge and mounted to be moved a limited angle around the center of an imagined sphere in which it is included.

4 Claims, 5 Drawing Figures

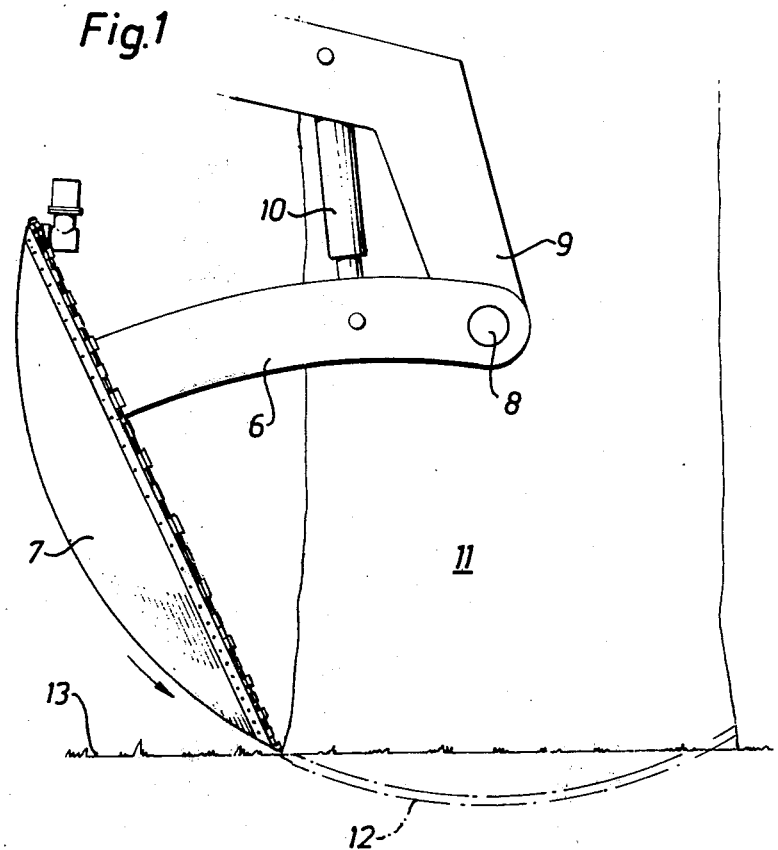
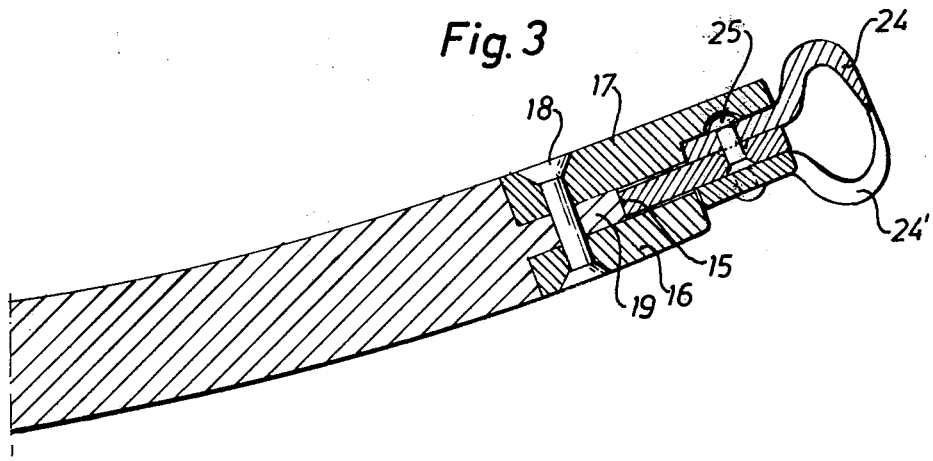

TREE FELLING DEVICE

BACKGROUND OF THE INVENTION

The invention refers to a tree felling device of the type which is adapted to be suspended in a crane beam carried by a vehicle. More particularly, the invention relates to a device described in my U.S. patent specification No. 3,835,901, where a spherical bowl carries a rotary saw ring at its periphery. Means are then provided to rotate the ring around its axis, and further means are provided for pivoting the bowl a limited angle around the centre of an imagined sphere, in which the bowl is included.

SUMMARY OF THE INVENTION

It has now proved possible to replace the saw ring for an endless saw chain of the kind commonly used in portable power driven chain saws. For that purpose, it is only necessary to design the saw chain such that it constitutes approximately a continuation of the shape of the bowl, and, moreover, a peripheral guiding groove at the edge of the bowl must be designed to guide the chain reliably without causing a too great frictional resistance.

Theoretically, the saw chain used in the new device should, strictly speaking, be shaped as a segment of the sphere in which the bowl is included, but in practice such a design would probably be very difficult to bring about. In fact, it has proved to be quite sufficient to bend the chain into a truncated cone nearly coincident with the perfect segment of the sphere. Hereby it is possible to start from a common straight saw chain and bend it to the required conical shape by means of a templet especially designed for that purpose.

In the ordinary way, the saw chain to be used includes links with depending tongues adapted to be engaged by driving means, such as sprockets, and the groove at the edge of the bowl is then dimensioned to receive and guide such depending tongues only. However, the inner wall of the groove is slightly extended radially to serve as an additional support for chain link portions located below the teeth. Hereby the saw chain will be guided reliably to resist lateral forces directed inwardly, i.e., against the centre of the bowl at the operation.

In accordance herewith, the improved tree felling device comprises a spherical bowl mounted to be moved a limited angle around the centre of an imagined sphere in which the bowl is included, means for pivoting the bowl around such centre, an endless saw chain extending along the peripheral edge of the bowl and bent to a truncated cone constituting approximately a continuation of the shape of the bowl, such saw chain including links with depending tongues adapted to be engaged by driving means, an annular groove at the edge of the bowl to receive and guide such depending tongues of the saw chain, the inner wall of the groove being extended to support chain link portions located below the teeth, and at least one sprocket driven by a motor and inserted in a recess at the edge of the bowl to engage the tongues of the saw chain.

If required, the inner wall of the groove guiding the saw chain may be formed with a peripheral chute or indentation to receive and guide the protruding heads, if any, of the pivot pins which connect the links of the saw chain.

The device described above has the advantage that it is possible to use common saw chains mass-produced at a moderate price, and that it is only necessary to bend such normal chains slightly crosswise in a rather simple manner. When, after some time of use, the teeth of the saw chain have been blunt, or some teeth have been destroyed, the chain may easily be removed and replaced by a new chain.

BRIEF DESCRIPTION OF THE DRAWINGS.

The invention will be further described hereinafter with reference to the accompanying drawings which show a preferred embodiment.

In the drawings:

FIG. 1 show diagrammatically a side view of the device in a position for felling a tree;

FIGS. 3 and 4 show, in a larger scale, cross sectional views on the lines III-III and IV-IV, respectively, in FIG. 2.

DETAILED DESCRIPTION OF THE INVENTION

Figure 2:
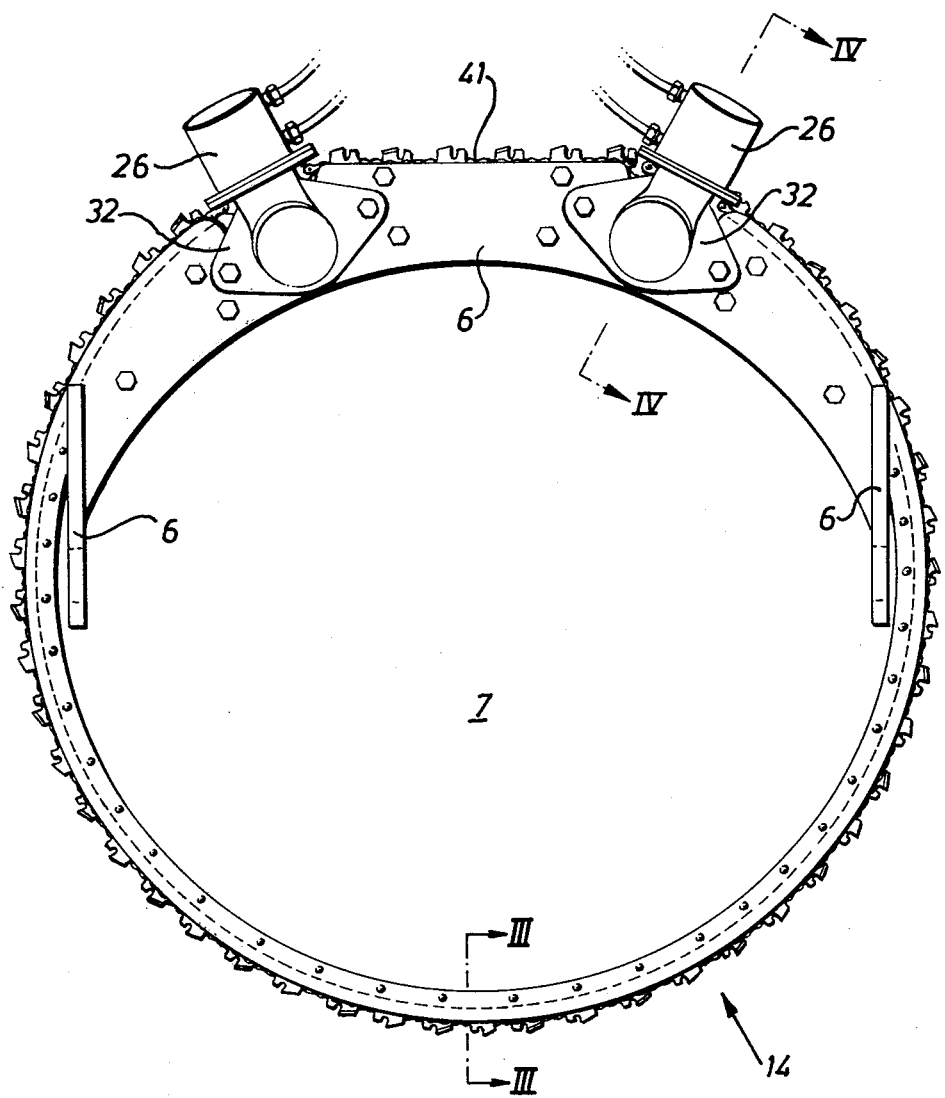
FIG. 2 shows the bowl and pertaining details, as seen from above.

As appears from FIGS. 1 and 2, a U-shaped yoke 6 has its central part secured to the inside of a bowl 7 by means of screws, and the central part is then designed as an arc extending along the edge of the bowl within an angle which is smaller than half the circumference of the bowl, preferably 100°–150°. The ends of the yoke 6 are by means of aligned pivots (only one of which can be seen at 8 in FIG. 1) connected to the legs of a fork 9 constituting the outermost part of a crane beam, otherwise not shown. The common axis of the pivots 8 passes through the centre of the imagined sphere in which the bowl 7 is included as a segment, and, moreover, such axis extends in parallel to the plane of the edge of the bowl. The bowl 7 may be pivoted by means of two hydraulic cylinders 10 each mounted between a crane beam leg 9 and adjacent end of the yoke 6.

In FIG. 1 the bowl saw has been shown in an inclined position before the sawing through of a trunk 11. The intended cut is indicated by dash dotted lines 12, and it is evident that a major portion of this cut may be located below the ground surface 13.

Figure 5:
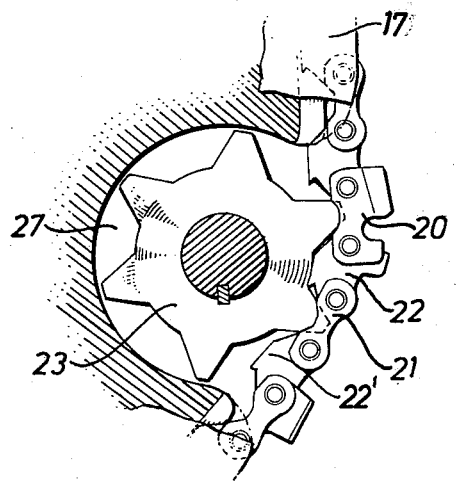
FIG. 5 shows a driving sprocket and a portion of the saw chain essentially on the lines V-V in FIG. 4.

An endless saw chain 14 (FIG. 2 and 5) of the kind used in portable chain saws has, after bending laterally to the required conical form, been inserted in a peripheral groove 15 (FIG. 3) at the edge of the bowl 7. In other words, the chain has been bent such that, as far as possible, its conical form constitutes a continuation of the profile of the bowl 7. Owing to the rather small height of the saw chain, the difference between such conical form and a corresponding segment of a sphere will be very insignificant and may be neglected.

In the embodiment shown, the edge portion of the bowl 7 is turned down to a rather thin fin 19, and two rings 16 and 17 are by screws or rivets 18 secured each to one side of fin 19. The rings 16,17 are formed and dimensioned to be included in the profile of the bowl 7, and together with the end surface of the fin 19 they define the annular groove 15 serving to guide the saw chain 14. As appears from FIG. 5, the saw chain is composed of cutting links 20, connecting links 21 and driving links 22, the driving links having depending tongues 22' adapted to engage a driving sprocket 23.

The groove 15 has a depth sufficient to receive depending tongues 22' only, but the ring 17 located at the inside of the bowl has a radial extension (FIG. 3) outside the groove to support the connecting links 21 and the lower portions of the cutting links 20, i.e., the portions below the curved teeth 24,24'. The supporting surface of the extension of the ring 17 has a peripheral indentation for receiving the heads 25 of the pivot pins connecting the links of the chain. As is also shown in FIG. 3, the teeth 24,24' of the saw chain are in the common way curved alternately in opposite directions, and preferably they occupy together a cross section equal to or possibly slightly greater than the thickness of the bowl 7.

In the embodiment shown, the saw chain 14 is adapted to be driven by two driving means mounted at a distance from each other on the middle portion of the yoke 6. Each of the driving means comprises a hydraulic motor 26 which drives the respective sprocket 23 by a gear transmission shown in section in FIG. 4.

Each sprocket 23 and adjacent part of its transmission are received in a recess 27 (FIG. 5) provided in the yoke 6 and in the wall of the bowl 7, and the chain guiding rings 16,17 are interrupted outside such recess. The sprocket 23 is fixed to the protruding end of a shaft 29 which is journalled in a cylindrical housing 28 by means of two ball bearings 30 and 31. The end of the housing 28 turned to the sprocket 23 is, in a manner not shown, secured to a mounting plate 32 which has an opening for the shaft 29 and is secured to the yoke 6 by screws so as to cover the recess 27.

Within the casing 28, the shaft 29 has keyed to it a conical gear 33 which is in engagement with a conical pinion 34 secured to the output shaft 35 of the motor 26. The motor shaft 35 is perpendicular to the shaft 29 and is, by means of ball bearings 37,38, journalled in another cylindrical housing 36 which is mounted to cover a corresponding opening in the wall of the housing 28. The motor 26 is flanged to the outer end of the housing 36.

Figure 4:
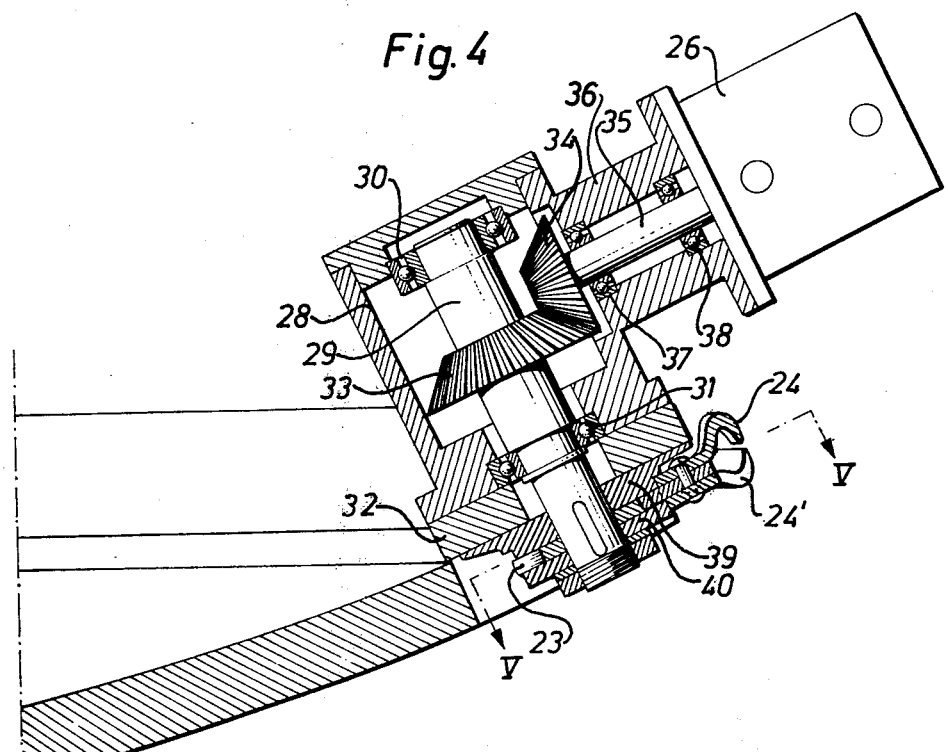

From FIG. 4 it would be obvious that, owing to the curvature of the bowl 7, the sprocket 23 and the opposite portion of the saw chain 14 will be situated in two different planes making a very blunt angle in relation to each other. This "distortion" may be compensated by giving the teeth of the sprocket 23 a corresponding inclined position, as seen in the axial direction of the sprocket. In other words, the sprocket is preferably shaped to coincide with the curvature of the bowl.

A spacer 39 may be keyed on the shaft 29 between the sprocket 23 and the mounting plate 32 to support such sprocket and the chain link tongues 22' meshing with the teeth of the sprocket. Another washer 40 may be keyed on the shaft 29 outside the sprocket 23 to serve as an external support for tongues 22'.

As appears from FIG. 2, the rear edge 41 of the bowl and thus the guiding groove of the chain are straight between the sprockets, as seen in the plane of the drawing. In this way the meshing between the chain and the sprockets (here not visible) will be more reliable.

A required supply of lubricant to the guiding groove 15 may be provided by means here not shown or described but previously well known in portable chain saws, for instance, where the saw chain runs in a groove in a bar between two sprockets.

What I claim is:

1. A tree felling device adapted to be suspended in a crane beam carried by a vehicle, said device comprising:
    a spherical bowl mounted to be moved a limited angle around the center of an imagined sphere in which the bowl is included, said bowl having an outer rim with an annular groove therein;
    means for pivoting the bowl around said center;
    an endless saw chain extending around said rim of said bowl, said chain being formed by links connected by pivot pins, said chain having a bent configuration in the form of a truncated cone with said pivot pins each extending in directions toward said center of said sphere;
    said saw chain including links with depending tongues adapted to be engaged by driving means, said depending tongues of said saw chain being received and guided in said annular groove;
    said groove having an inner wall extended to support chain link portions located below and inward of the teeth of said chain; and
    at least one sprocket driven by a motor and inserted in a recess at said rim of said bowl and engaging said tongues of said saw chain.

2. A tree felling device as claimed in claim 1, wherein said pivot pins are provided with protruding heads, and the extended portion of said inner wall of said groove has therein a peripheral indentation receiving said heads.

3. A tree felling device as claimed in claim 1, wherein said inner wall of said groove comprises a ring section removably mounted at said rim of said bowl.

4. A tree felling device as claimed in claim 1, wherein said at least one sprocket comprises two sprockets mounted at a distance from each other at a rear bowl portion remote from an operative cutting bowl portion, said rear bowl portion and adjacent saw chain portion extending in a substantially straight line between said sprockets.

* * * * *